(No Model.)

C. E. LIPE.
BROOM CORN SIZING MACHINE.

No. 410,840. Patented Sept. 10, 1889.

WITNESSES:
C. L. Bendixon
J. J. Laass

INVENTOR
Charles E. Lipe
BY
Duell, Laass & Duell
his ATTORNEYS

UNITED STATES PATENT OFFICE.

CHARLES E. LIPE, OF SYRACUSE, NEW YORK, ASSIGNOR TO THE HAND STITCH BROOM SEWING MACHINE COMPANY, OF PITTSBURG, PENNSYLVANIA.

BROOM-CORN-SIZING MACHINE.

SPECIFICATION forming part of Letters Patent No. 410,840, dated September 10, 1889.

Application filed May 6, 1889. Serial No. 309,714. (No model.)

*To all whom it may concern:*

Be it known that I, CHARLES E. LIPE, of Syracuse, in the county of Onondaga, in the State of New York, have invented new and useful Improvements in Broom-Corn-Sizing Machines, of which the following, taken in connection with the accompanying drawings, is a full, clear, and exact description.

This invention relates to the class of broom-corn-sizing machines in which endless conveyers carry the broom-corn upon a table having successively-enlarged openings, through which the different lengths of broom-corn drop.

The invention consists in an improved organization of said machine, which is more efficient in its operation, as hereinafter fully described, and specifically set forth in the claims.

Figure 1:
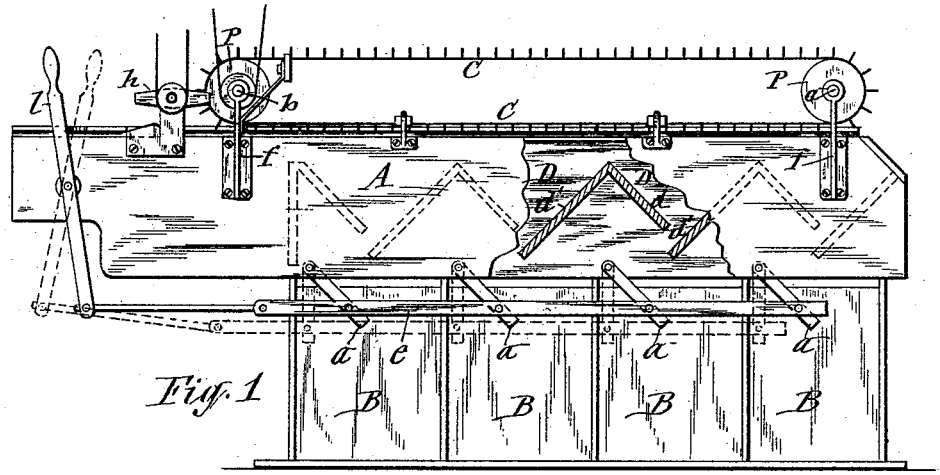
Figure 2:
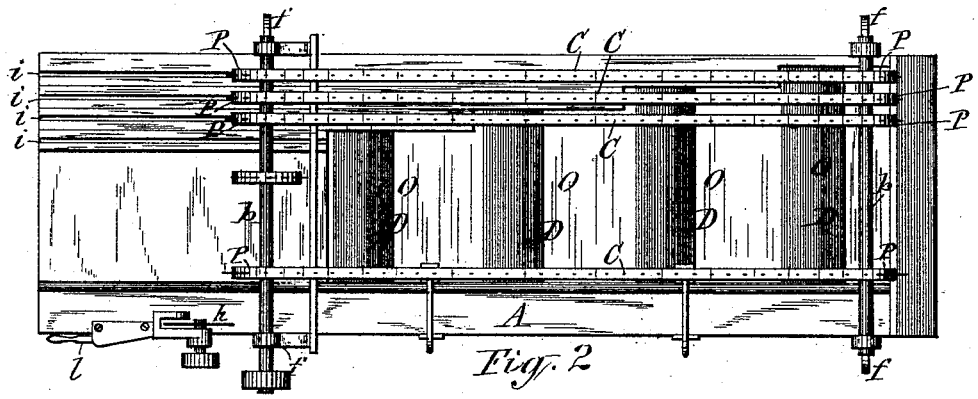
Figure 3:
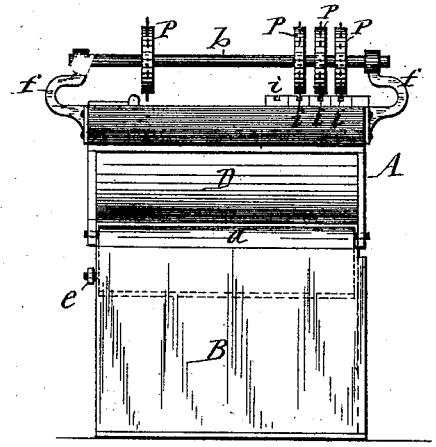

In the annexed drawings, Figure 1 is a side elevation of my improved broom-corn-sizing machine. Fig. 2 is a top plan view, and Fig. 3 is an end view, of the same.

Similar letters of reference indicate corresponding parts.

A denotes the table, which is formed with successively-enlarged openings O O O, as shown in Fig. 2 of the drawings. Across opposite ends of the table, above the top thereof, are arranged two shafts $b\ b$, which are journaled in standards or brackets $f\ f$, secured to opposite sides of the table. To each of said shafts is secured a series of pulleys P P P, arranged, respectively, in lines with the pulleys of the other shaft, and on each pair of pulleys thus arranged runs an endless conveyer C, consisting of a belt, from the outer side of which projects a series of pins distributed over the entire length of the belt. The openings O O O are all in line with each other on one side of the table and form one continuous edge in the table, and the successive reductions in the widths of the openings are made on the opposite side of the table. The aforesaid pulleys are so arranged as to carry one of the conveyers C on top of the table near the continuous edge of the openings O O O, and the other conveyers are carried near the opposite edges of the respective openings. The top of the table is provided with longitudinal grooves $i\ i$ for the passages of the pins of the conveyers.

In the operation of the machine the broom-corn is placed upon the table, with the stalk ends toward one side of the table, and in the majority of such machines the said ends of the broom-corn are all gaged to a line by means of a circular saw connected to the table and cutting off the stalks evenly. In lieu of this saw I have shown a rotary knife $h$, disposed vertically and in a line parallel with the conveyers C C, the broom-corn being placed crosswise of the table in front of the said knife and in position to cause the knife to sever the stalk. The broom-corn is thence passed under the conveyers C C, which carry it along upon the table, and in passing over the openings O O O the broom-corn of different lengths drops through the aforesaid openings according to the widths thereof. In falling through the openings the broom-corn descends with the tips or wisp ends foremost, and in the machines as heretofore constructed the broom-corn was, in the manner aforesaid, sometimes completely turned over end for end, and consequently caused disarrangement of the assorted broom-corn. It is to overcome this defect which my present invention has for its object; and to that end I arrange under each opening O a stationary chute D, consisting of two plates $d\ d'$, which are inclined toward each other with a mouth or opening between their lower edges and with the bottom edge of the plate $d'$ extending beneath the edge of the plate $d$, as shown in Fig. 1 of the drawings. The broom-corn in falling from the table strikes with its tip or wisp end first on one of the plates of the chute, and in sliding down to the opposite plate the stalk end of the broom-corn is caused to fall to the mouth of the chute before the broom-corn is thrown into such an angle as to incur the liability of turning it over end for end. Short broom-corn, however, is still liable to be turned over, as aforesaid, in its passage from the chute D; and to guard against this I employ under each chute a gate $a$, which I preferably hinge at one edge under the plate $d$, and sustain it normally inclined toward the mouth of the chute and in opposite direction from the inclination of the plate $d'$, or delivery side of the chute. The interposition of the said gate between the chute and subjacent bin B causes the descending broom-corn to be arrested sufficiently to allow it to right itself in its requisite position before falling into the bin. By hinging or pivoting the gate $a$, as aforesaid, I am enabled to swing the gate away from the mouth of the chute, as represented by dotted lines in Fig. 1 of the drawings. This is resorted to in case the mouth of the chute becomes choked by the broom-corn.

In order to allow all the gates to be adjusted simultaneously, I connect them together by a rod $e$, and connect said rod to a lever $l$, pivoted to the frame of the machine.

To render the machine still more efficient, I leave the belts or conveyers C C unsupported between their carrying-pulleys, and thus permit the said conveyers to vibrate vertically and shake the broom-corn from the conveyers into the chutes.

Having described my invention, what I claim as new, and desire to secure by Letters Patent, is—

1. In combination with the table A, formed with the successively-enlarged openings O O, conveyers C C over said table, chutes D D under the said openings, and bins B B beneath the respective chutes, the gates $a\ a$, interposed between the chutes and bins and inclined in opposite direction from the delivery sides of the chutes, substantially as described and shown.

2. In combination with the table A, formed with the successively-enlarged openings O O, conveyers C C over said table, chutes D D, each composed of two plates $d\ d'$, inclined toward each other and having the bottom edge of the plate $d'$ extending beneath that of the plate $d$, and bins B B beneath the said chutes, the gates $a\ a$, hinged at one edge under the plates $d\ d$, and their free edges adapted to swing toward the bottom edges of the plates $d'\ d'$, the rod $e$, connected to the gates, and the lever $l$, connected to the said rod, substantially as described and shown.

In testimony whereof I have hereunto signed my name this 22d day of April, 1889.

CHARLES E. LIPE. [L. S.]

Witnesses:
C. L. BENDIXON,
MARK W. DEWEY.